United States Patent
Potuluri et al.

(10) Patent No.: US 8,144,320 B2
(45) Date of Patent: Mar. 27, 2012

(54) METHOD AND APPARATUS FOR RECONSTRUCTING OPTICAL SPECTRA IN A STATIC MULTIMODE MULTIPLEX SPECTROMETER

(75) Inventors: Prasant Potuluri, Raleigh, NC (US); Mehran Ghofrani, Cary, NC (US); Evan Christopher Cull, Durham, NC (US); John Edward Stranzl, Jr., Holly Springs, NC (US)

(73) Assignee: Optopo, Inc., Morrisville, NC (US)

( * ) Notice: Subject to any disclaimer, the term of this patent is extended or adjusted under 35 U.S.C. 154(b) by 1142 days.

(21) Appl. No.: 11/942,855

(22) Filed: Nov. 20, 2007

(65) Prior Publication Data

US 2008/0118181 A1    May 22, 2008

Related U.S. Application Data

(60) Provisional application No. 60/866,921, filed on Nov. 22, 2006.

(51) Int. Cl.
*G06K 9/00* (2006.01)
*G01J 3/00* (2006.01)

(52) U.S. Cl. .......................... 356/300; 382/181
(58) Field of Classification Search .......... 356/300–334; 382/181–231
See application file for complete search history.

(56) References Cited

U.S. PATENT DOCUMENTS

| 5,050,989 A | 9/1991 | Van Tassel et al. |
| 5,239,591 A * | 8/1993 | Ranganath .................... 382/128 |
| 6,091,843 A * | 7/2000 | Horesh et al. ................. 382/133 |
| 2006/0274308 A1* | 12/2006 | Brady et al. .................. 356/326 |

FOREIGN PATENT DOCUMENTS

WO    2006078687 A3    7/2006

OTHER PUBLICATIONS

Gehm, M. E. et al. "Static Two-Dimensional Aperture Coding for Multimodal, Multiplex Spectroscopy." Applied Optics, May 1, 2006, vol. 45, No. 13, pp. 2965-2974.

* cited by examiner

*Primary Examiner* — Alex Liew
(74) *Attorney, Agent, or Firm* — John R. Kasha; Kasha Law LLC

(57) ABSTRACT

The static MMS spectral reconstruction process is optimized using algorithmic methods. Because the static MMS encodes spectral information across the detector plane in a highly non-local way, optical errors have a non-local effect on the reconstruction which introduces noise and errors at regions throughout the spectral range. Mathematical signal processing techniques are used to condition and deconvolve the spectral image to compensate for non-ideal system behavior. Spectral signal-to-noise and accuracy are both improved, while the inherent resolution and etendue advantages of the static MMS technique are retained.

27 Claims, 13 Drawing Sheets

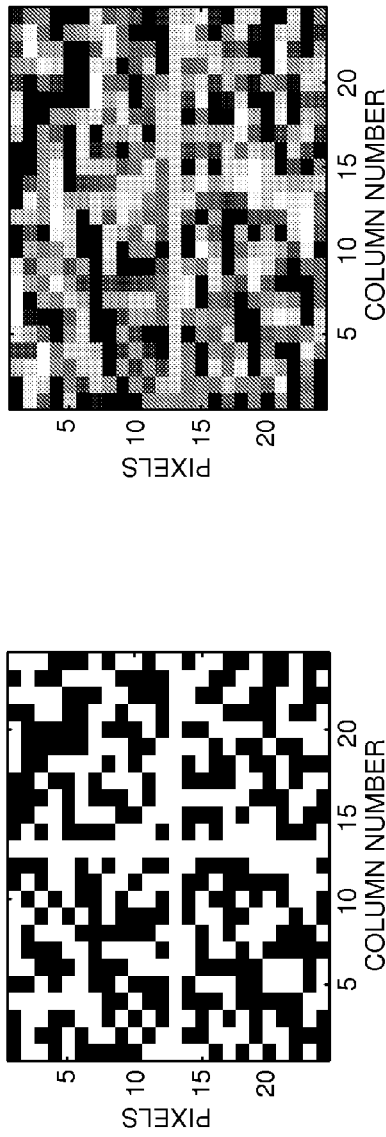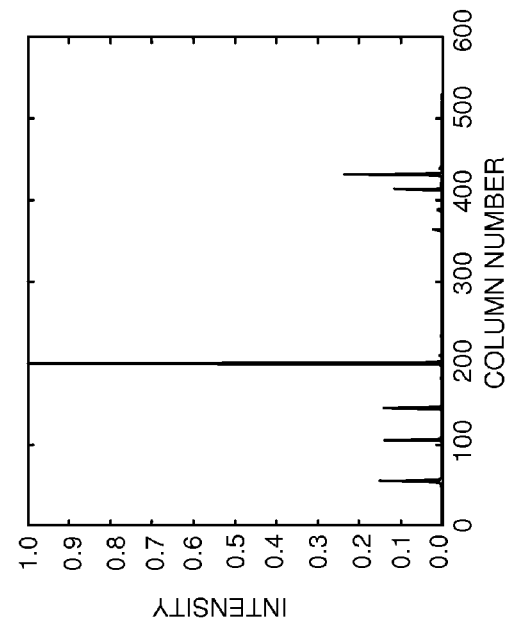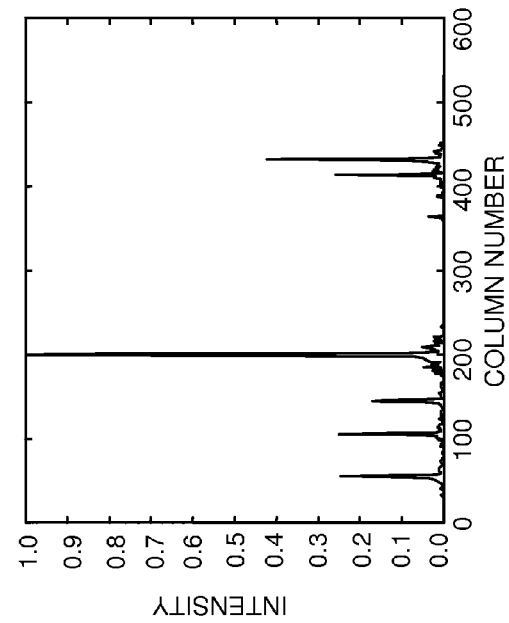

METHOD AND APPARATUS FOR RECONSTRUCTING OPTICAL SPECTRA IN A STATIC MULTIMODE MULTIPLEX SPECTROMETER

This patent claims priority from U.S. Provisional Application No. 60/866,921, filed 22 Nov. 2006, which is incorporated herein by reference.

BACKGROUND

The present invention generally relates to methods of signal processing for improved spectral reconstruction, and more particularly to algorithmic methods for conditioning and deconvolving a spectral image to compensate for non-ideal behavior in a static multimode spectrometer.

An exemplary spectrometer for static Multimodal Multiplex Spectrometry (MMS) is described in U.S. application Ser. No. 11/334,546, filed Jan. 19, 2006, which is herein incorporated by reference. "Static" refers to the lack of mechanical, electro-optical or other active modulation in reconstructing the optical spectrum.

In present applications of static MMS, the imaging of an aperture through a dispersion system, e.g., a diffraction grating, results in an image that is curved in the direction of the dispersion (i.e., so called smile distortion). Assuming that the curvature is corrected or is negligible, accurate mathematical reconstruction of the spectral content relies on several key assumptions: 1) the propagation kernel is free from distortion, 2) the system input is a diffuse light source that has uniform intensity in the x and y directions, and 3) the detector resolution is higher than that of the mask elements. These assumptions were noted in Gehm et al., "Static 2D aperture coding for multimodal multiplex spectroscopy," Appl. Opt. 45(13) 2965-74, May, 2006. In addition, accurate mathematical reconstruction of the spectral content relies on the assumption that the dispersion system does not cause nonlinear dispersion in the spectrometer.

These assumptions may be problematic because some propagation kernels may behave non-ideally, because certain diffuse sources, such as liquids, may provide non-uniform illumination of the coded aperture, and because dispersion systems may disperse light in a nonlinear. Simple spectral reconstruction using the conventional methods may therefore introduce spectral artifacts in the reconstructed optical spectrum.

SUMMARY

The present invention is concerned with algorithmic methods that improve static MMS spectral reconstruction. Broadly, the present invention describes a method for generating a reconstructed optical spectrum from light radiated from a source and incident on a static multimode multiplex spectrometer. The method comprises generating a dispersed mask image at a detector array of the spectrometer responsive to the incident light. The method further comprises electronically processing the dispersed mask image to generate the reconstructed optical spectrum and to reduce spectral artifacts introduced into the spectrometer by the source, a non-ideal response of a propagation kernel of the static multimode multiplex spectrometer, and/or a nonlinear response of a dispersion system in the spectrometer.

In one exemplary embodiment, the present invention reconstructs the optical spectrum by generating a correction mask that compensates for the non-ideal response of a propagation kernel of an optical system in the spectrometer. For example, the correction mask may be generated by applying the propagation kernel to light radiated from a calibration source to generate a calibration image, processing the calibration image to generate a calibration mask, and generating the correction mask based on the calibration mask. By applying the propagation kernel to incident light radiated from an unknown source to generate a dispersed mask image, and by electronically processing the dispersed mask image based on the correction mask, the present invention reduces spectral artifacts in the reconstructed optical spectrum.

In another exemplary embodiment, the present invention reconstructs the optical spectrum by generally matching an intensity profile of the dispersed mask image to an intensity profile of a reconstructed mask pattern associated with the spectrometer. By electronically processing the dispersed mask image and the reconstructed mask pattern thereafter, the present invention reduces spectral artifacts in the reconstructed optical spectrum. In one embodiment, the intensity profiles may be matched by normalizing the intensity profile of the dispersed mask image. In this case, the normalized version of the dispersed mask image is electronically processed to generate the reconstructed optical spectrum. In another embodiment, the intensity profiles may be matched by adjusting the intensity profile of the reconstructed mask pattern relative to the intensity profile of the dispersed mask image to generate a modified version of the reconstructed mask pattern. In this case, the modified version of the reconstructed mask pattern is electronically processed relative to the dispersed mask image to generate the reconstructed optical spectrum.

In another exemplary embodiment, the present invention electronically processes the dispersed mask image to generate a reconstructed spectral image, and generates the reconstructed optical spectrum by electronically processing the reconstructed spectral image based on a calibration data set that compensates for nonlinear dispersion associated with a dispersion system in the spectrometer. By electronically processing the reconstructed spectral image based on the calibration data set, the present invention reduces nonlinear dispersion effects in the reconstructed optical spectrum. In one embodiment, the calibration data set maps individual pixels of the reconstructed spectral image to a specific wavelength.

In another exemplary embodiment, the present invention may combine the correction mask, normalized intensity profile, and/or nonlinear dispersion correction methods described above to generate the reconstructed optical spectrum with reduced spectral artifacts.

BRIEF DESCRIPTION OF THE DRAWINGS

FIGS. 5A and 5B shows a representative binary mask matrix and a grayscale MSF matrix, respectively.

FIG. 6 shows an exemplary reconstructed optical spectrum obtained using the binary mask matrix.

FIG. 7 shows an exemplary reconstructed optical spectrum obtained using the grayscale MSF matrix.

DETAILED DESCRIPTION

Figure 1:
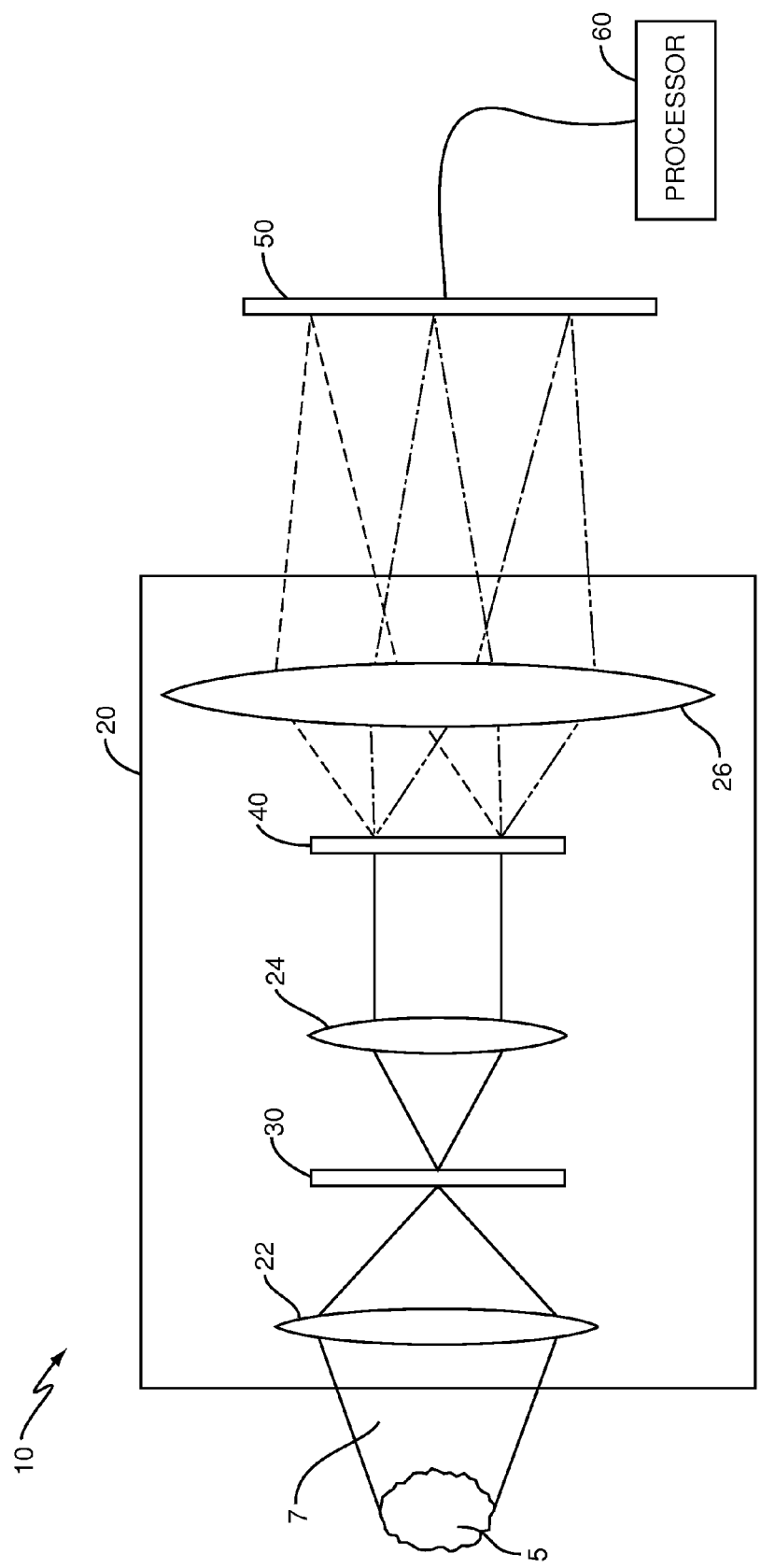
FIG. 1 shows a block diagram of a side view of one exemplary multiple diffraction order optical spectrometer

FIG. 1 shows an exemplary static MMS system 10. The static MMS system 10 includes an optical system 20, a two-dimensional detector array 50, and a processing unit 60. Optical system 20 includes a coded aperture 30, one or more lens systems 22, 24, 26, and a dispersion system 40. The optional collection lens system 22 may be used to collect the incident light 7 radiated from the source 5 (e.g., the sample under consideration) and focus it onto the coded aperture 30, if desired. The coded aperture 30 spatially filters the incident light 7 according to a coded aperture function. Coded aperture 30 advantageously comprises a pattern of transmissive sections 32 and opaque sections 34 defined by the coded aperture function. Each column of a coding matrix defined by the coded aperture function is orthogonal under an inner product transformation. The coded aperture 30 may comprise any known coded aperture, including but not limited to a Harmonic mask, a Legendre mask, S-matrix, and a row-doubled Hadamard mask. A first imaging lens system 24 collimates the spatially filtered light from the coded aperture 30 before the filtered light is passed to dispersion system 40. The dispersion system 40 induces a wavelength-dependent spatial shift of the image of the coded aperture 30. A second imaging lens system 26 focuses the dispersed light onto the detector array 50. Operatively, first and second imaging lens systems 24, 26 help generate a dispersed mask image comprising multiple images of the coded aperture 30 associated with different wavelengths at the detector array 50, while dispersion system 40 helps position images of the coded aperture 30 associated with different wavelengths on different portions of the detector array 50.

The source radiation from the dispersion system 40 is captured by a two-dimensional detector array 50 of detector elements, and the detector elements convert the wavelength-dependent spatial shift image of the coded aperture 30 into light intensity values. The detector array 50 provides electrical signals output by the detector elements to the processing unit 60. Processing unit 60 electronically processes the detector output signals to extract wavelength-specific information about the source 5 from the detected light to generate the reconstructed optical spectrum. The processing unit 60 of the present invention further electronically processes the detector output signals to reduce spectral artifacts caused by a non-uniform source, a non-ideal propagation kernel, and/or non-linear dispersion system response, as discussed further below.

Processing unit 60 stores the intensity values output by the detector elements and associated with the dispersed mask image in a data matrix and performs a transformation of the data matrix to produce a reconstructed spectral image that mathematically represents the optical spectrum of the source radiation. Generally, the reconstruction process involves solving a set of linear equations given by:

$$Ax=b \qquad (1)$$

where A is a matrix representing a reconstruction mask pattern, x is a matrix representing a reconstructed spectral image, and b is a data matrix representing the dispersed mask image at the detector. In conventional solutions, A comprises a binary mask matrix. To determine the spectral content of the input, the processing unit 60 solves the above system of equations either directly or iteratively by algorithmic means such as pseudo-inverse or least-squares based methods to determine the reconstructed spectral image x. Based on the reconstructed spectral image x, the processing unit 60 generates the reconstructed optical spectrum. Because static MMS encodes spectral information across the detector plane in a highly non-local way, optical errors and distortion anywhere in the system 10 have a non-local effect on the reconstruction, which introduces noise and/or errors at regions throughout the spectral range.

The present invention reduces the spectral artifacts present in, and increases the signal-to-noise ratio of, the optical spectrum reconstructed for a diffuse source, where the spectrum is reconstructed by a static multimode multiplex spectrometer. In so doing, the present invention addresses the spectral artifacts caused by a non-ideal propagation kernel, non-uniform illumination of the coded mask aperture, and nonlinear dispersion. Details of the exemplary embodiments for reducing the spectral artifacts are discussed in further detail below.

One of the key contributors of spectral artifacts that appears within a static MMS spectrum following reconstruction with a binary mask matrix is due to the non-ideal response of the propagation kernel. An ideal propagation kernel for an optical system 20 having unity-magnification may be modeled as:

$$H(x,y)=\delta(y-y')\delta(x-(x'+\alpha(\lambda-\lambda_c))) \qquad (2)$$

where α represents the linear dispersion in the dispersion direction (x-direction) and $\lambda_c$ represents a center wavelength for an aperture at x=0. In reality, the propagation kernel is influenced by optical blur caused by imperfect dispersion, optical misalignments, spatial and spectral non-linearity in the optical system 20, and noise arising from the detector 50 and related electronics. Further, certain sources, notably liquids, cause non-uniform illumination of the coded aperture. As a result, the actual propagation kernel may differ from the above-described ideal, which creates spectral artifacts in varying degrees within the reconstructed optical spectrum. One exemplary embodiment of the present invention, referred to herein as the grayscale mask embodiment, provides a technique by which the static MMS system response is measured and incorporated into reconstruction calculations in the form of a correction mask, such as a grayscale mask spread function (MSF) matrix. This technique generally produces a much higher signal-to-noise ratio by reducing spectral artifacts and anomalies in comparison to reconstruction calculations that rely solely on a binary mask matrix.

Figure 2:
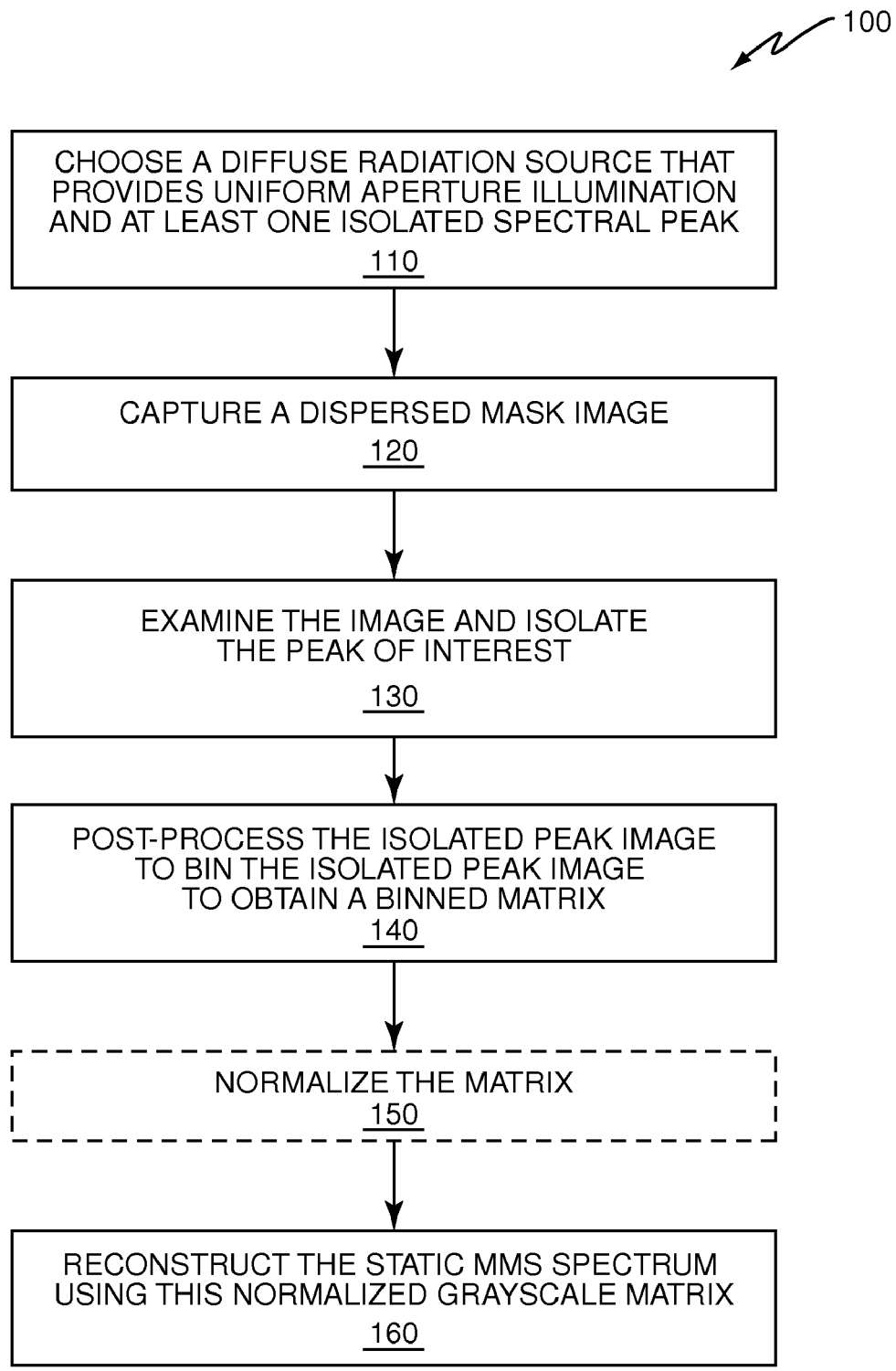
FIG. 2 shows a method of creating a grayscale mask spread function (MSF) matrix within the present invention.

FIG. 2 shows one exemplary process 100 for generating a grayscale MSF matrix. First, a diffuse calibration radiation source that presents at least one independent, isolated spectral peak to the detector is chosen (block 110). Due to the wide aperture of static MMS spectrometers and the spectral dispersion occurring in the x-direction, the dispersed mask image is carefully scrutinized when choosing a radiation source because closely-spaced peaks frequently overlap. A raw dispersed mask image resulting from the selected diffuse radiation source is then captured by the detector 50 (block 120). The image is examined and at least one isolated peak is selected for post-processing (block 130). If only one MSF matrix is to be used for the entire spectral range, it is preferable to select a peak that lies somewhere in the middle of the instrument's dynamic spectral range. In this manner, variation in system response across the detector 50 will effectively be averaged. Regardless, the isolated peak should be selected to ensure that the isolated peak does not overlap other spectral peaks during this peak selection process.

Figure 3:
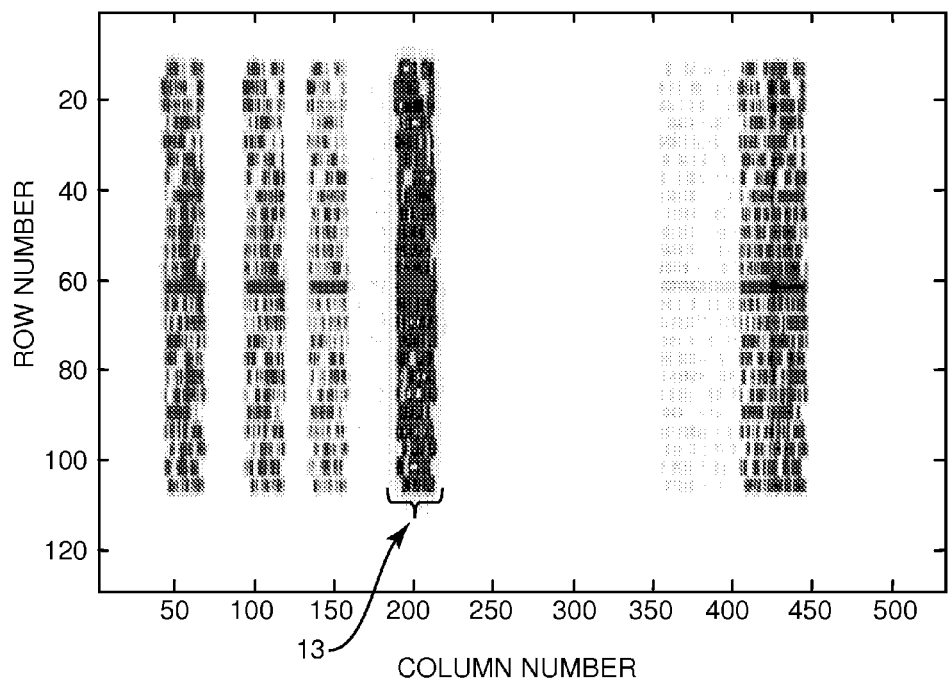
FIG. 3 shows an enlarged, un-binned, dispersed mask image at a detector array.

As an example, FIG. 3 shows a dispersed mask image depicting the spectral content of a Xenon lamp at the detector array 50. In this example, each MMS mask element corresponds to three detector elements in the vertical direction and one in the horizontal direction. Interleaved between each active mask row is an opaque row to minimize inter-row crosstalk. A representative strong, uniform, isolated spectral peak 13 within a range of approximately 190 to 210 pixels is indicated. Such an ideal peak should provide a near-uniform illumination at the detector 50 in horizontal and vertical directions.

Figure 4:
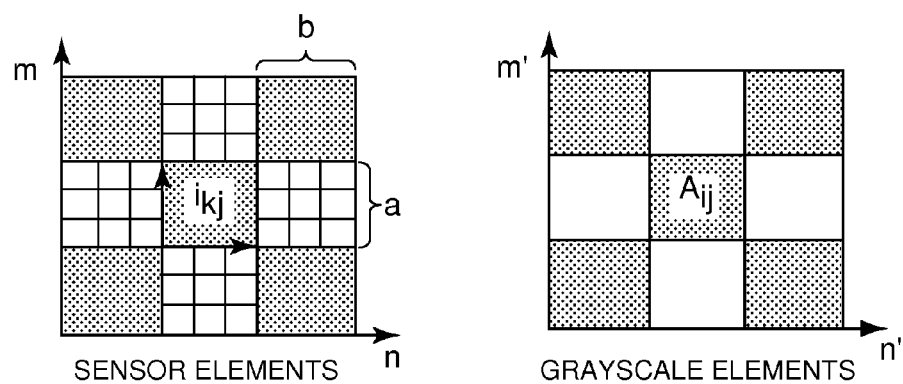
FIG. 4 shows the binning process as applied to a matrix of detector outputs.

In any event, the isolated spectral peak 13 is binned (block 140). Binning adds or combines signals from multiple detector elements to generate one value. Binning may be applied in horizontal and/or vertical directions on the detector plane. FIG. 4 shows an exemplary binning process implemented according to:

$$\hat{A}_{i,j} = \sum_{k=p}^{ai} \sum_{l=q}^{bj} i_{k,l}, \quad (3)$$

where $\hat{A}_{i,j}$ represents the $i^{th}$ row and $j^{th}$ column element of the binned matrix $\hat{A}$ of order m'×n', $i_{k,l}$ represents the output of the $k^{th}$ row and $l^{th}$ element of an m×n detector array 50, a represents the vertical detector element to mask element ratio, b represents the horizontal detector element to mask element ratio, p=a(i−1)+1, and q=b(j−1)+1.

The binning process depends on the mask element-to-pixel ratio, and the resultant matrix should be of the same order as the mask's binary matrix. In one embodiment, the binned matrix generated by Equation (3) may be used as a grayscale MSF matrix for processing the dispersed mask image. For this embodiment, the grayscale MSF matrix $\hat{A}$ is saved and repeatedly used for MMS spectral reconstruction according to Equation (4) (block 140).

$$\hat{A}x=b \quad (4)$$

In another embodiment, the matrix $\hat{A}$ may be normalized to further improve the grayscale MSF matrix by dividing every component of the matrix by the component of greatest magnitude to produce a normalized grayscale MSF matrix $\overline{A}$, as shown in Equations (5) and (6) (block 150).

$$\alpha_i = \sum_{j=1}^{n} A_{i,j} \quad (5)$$

$$\overline{A}_{i,j} = \frac{1}{\max(A)} \frac{\max(\alpha)}{\alpha_j} A_{i,j} \quad (6)$$

In Equations (5) and (6), α represents the m'×1 column matrix containing the summed intensities of the rows in the column and $\overline{A}_{i,j}$ represents elements of the normalized grayscale MSF matrix $\overline{A}$. The normalized grayscale MSF matrix $\overline{A}$ serves as a correction mask that incorporates the binary mask pattern with the optical system's propagation kernel response. The normalized grayscale MSF matrix $\overline{A}$ is then saved and repeatedly used for static MMS spectral reconstruction, as shown in Equation (7) (block 160).

$$\overline{A}x=b \quad (7)$$

FIGS. 5A and 5B respectively show an exemplary binary mask matrix A and an exemplary normalized grayscale MSF matrix $\overline{A}$. It will be appreciated that the above calculations represent just one possible way to generate the grayscale matrix, and that other methods may also be used. Further, it will be appreciated that the correction mask of the present invention is not limited to the grayscale MSF matrix discussed above.

FIG. 6 shows a xenon lamp spectrum obtained by static MMS spectral reconstruction using the binary mask matrix of FIG. 5A. FIG. 7 shows a xenon lamp spectrum obtained by static MMS spectral reconstruction using the normalized grayscale MSF matrix $\overline{A}$ of FIG. 5B. Note the absence of spectral artifacts and baseline noise in FIG. 7.

Figure 8:
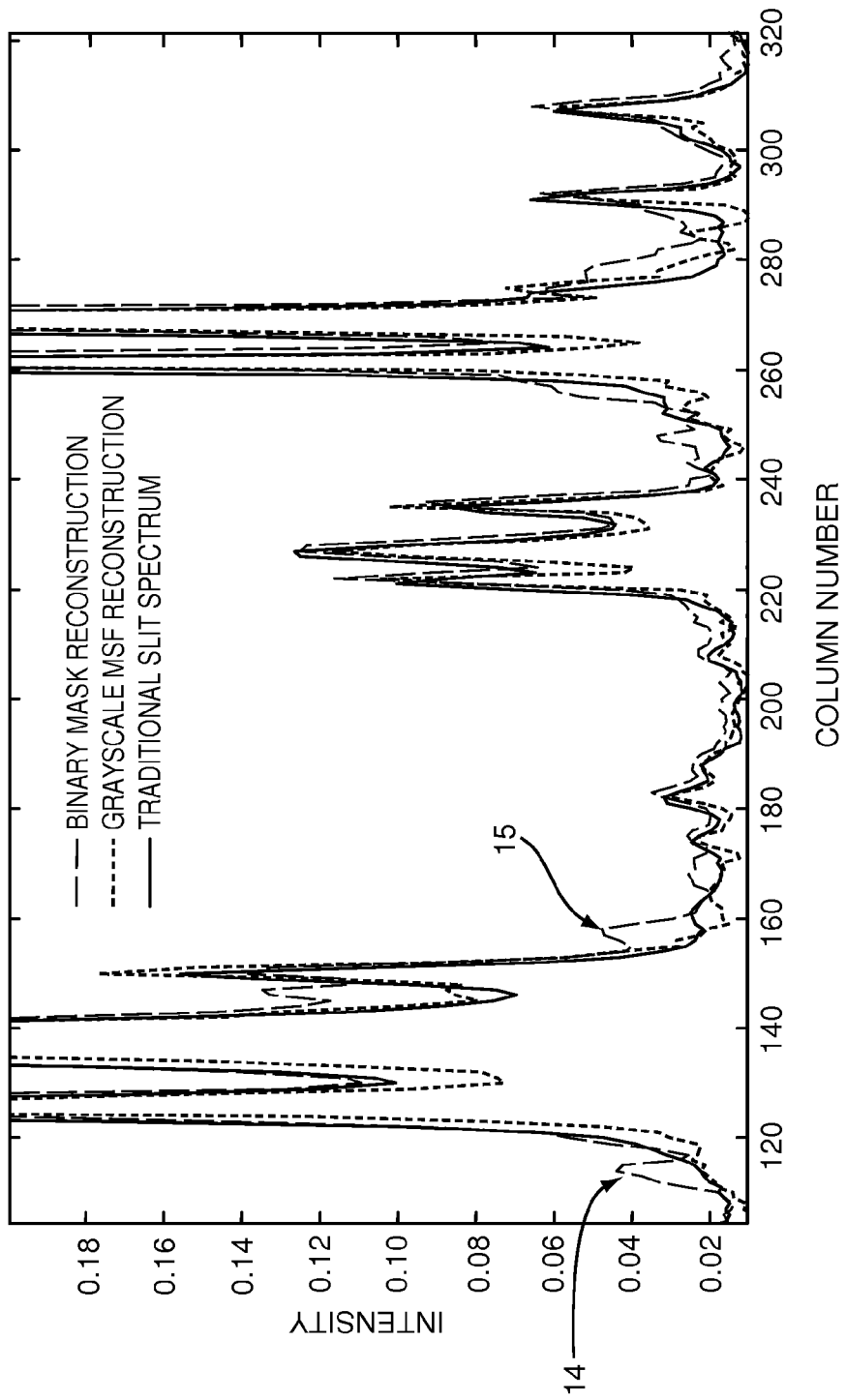
FIG. 8 shows exemplary reconstructed optical spectra obtained by static MMS measurement using binary mask reconstruction, static MMS measurement using grayscale MSF reconstruction, and traditional measurement using a slit-based spectrometer.

The quality of static MMS measurement of chemical samples is also improved following grayscale reconstruction. FIG. 8 depicts a magnified view of select ranges of three bis-methylstyrylbenzene (BMSB) spectra obtained by static MMS measurement using binary mask reconstruction, static MMS measurement using grayscale MSF reconstruction, and traditional measurement using a slit-based spectrometer. Note that spectral artifacts 14 and 15, which appear in the binary mask reconstruction, are removed when the grayscale MSF technique is utilized. The spectrum produced using grayscale MMS reconstruction more closely approximate the spectrum obtained by a traditional slit-based spectrometer, while retaining the spectral resolution and etendue advantages of the static MMS measurement.

One skilled in the art will recognize that the grayscale mask embodiment may be extended by measuring multiple isolated peaks across the dynamic spectral range of the detector 50. A plurality of grayscale MSF matrices may then be produced by sampling discrete columnar regions across the detector 50. Spectral reconstruction then proceeds according to the methods described previously. However, because this approach will yield a plurality of grayscale MSF matrices that individually describe system response across the spectral range, the reconstruction of a particular spectrum will need to be carried out in a step-wise manner. For example, a grayscale MSF matrix for the spectral range of 200 nm to 400 nm would only be used for deconvolution of that portion of the analytical spectrum lying within the range of 200 nm to 400 nm. A second grayscale MSF matrix for the spectral range of 401 nm to 600 nm would only be used for deconvolution of the 401 nm to 600 nm range of the analytical spectrum. By this approach, it is anticipated that spectral quality will be enhanced because the overall system response will be more accurately measured, and represented, across the detector 50. The resulting plurality of grayscale MSF matrices may then be utilized directly within the deconvolution calculations.

Reconstruction efficiency using the grayscale MSF technique is limited whenever the pre-measured system response and the analytical spectrum have mismatched illumination profiles. As described previously, the ideal spectral image for creating a grayscale MSF from an isolated peak should provide a diffuse, near-uniform illumination at the detector 50 in the vertical direction when dispersion is in the horizontal direction. For this purpose, one may selectively choose radiation sources that provide uniform detector illumination. However, some real-world analytical samples may present non-diffuse and non-uniform spectral profiles to the detector 50. Un-equalized detector illumination is particularly significant in liquid samples where the signal is not uniformly scattered. Clear liquids are known to scatter from a point spot in comparison to the diffuse scattering observed for most solids.

Figure 9:
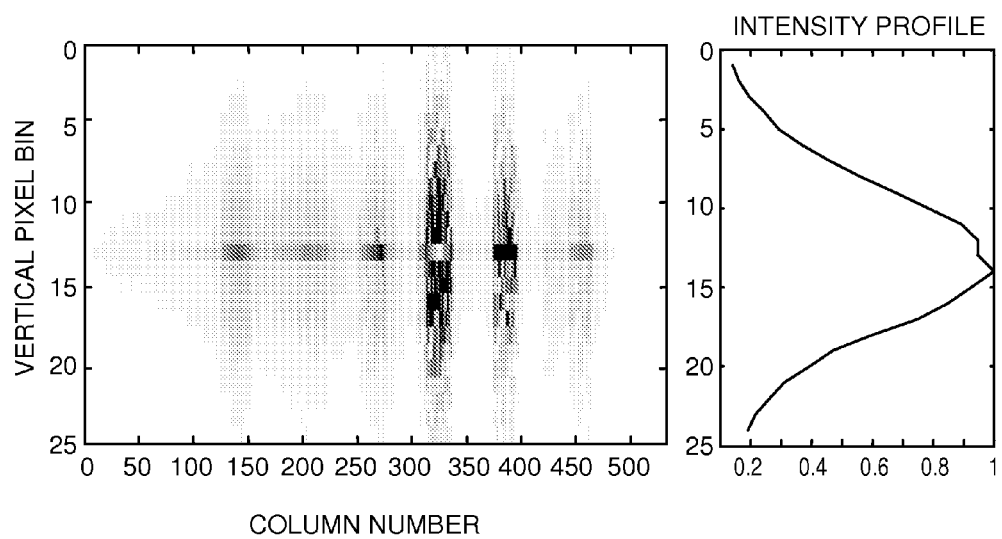
FIG. 9 shows an exemplary binned dispersed mask image at the detector array and the corresponding intensity profile.

The non-uniform illumination may either be observed visually by someone skilled in the art, or confirmed mathematically by summing the horizontal pixels of a detector image to produce a gross vertical intensity profile. When the vertical intensities of the typical clear liquid sample are graphed, a non-uniform (e.g., Gaussian, etc.) profile results with intensity values distributed normally around the center of the mask image, as shown in FIG. 9. In an ideal situation, the optical front end prior to the coded aperture 30 will condition the input light from such samples so that it is well-diffused and uniform across the mask image. The resulting ideal intensity profile will be uniform with intensity values distributed equally across the vertical face of the detector 50. This condition is conventionally achieved by adding additional optical elements to the system to achieve the desired diffuse illumination of the coded aperture. However, this is a less-than-ideal solution because it increases system complexity and reduces signal strength.

Figure 10:
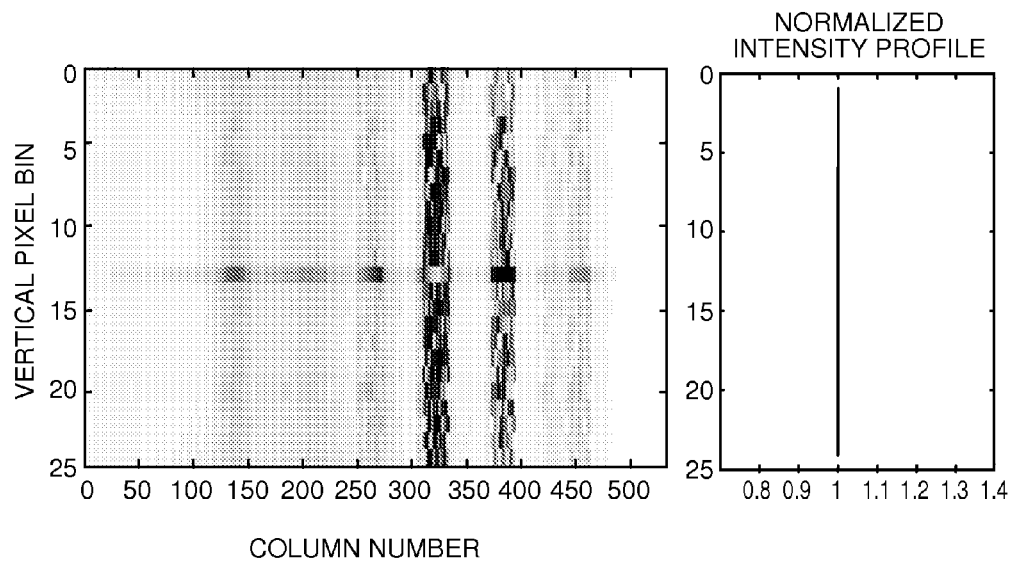
FIG. 10 shows an exemplary binned and normalized dispersed mask image at the detector array and the corresponding intensity profile.

Another exemplary embodiment of the present invention, referred to herein as the normalization embodiment, presents a technique by which intensity profiles of the dispersed mask image and the reconstructed mask pattern generally matched. In one example of the normalization embodiment, the raw data of the dispersed mask image is normalized in at least one direction to obtain a uniform intensity profile, as shown in FIG. 10. Illumination normalization depends on the specific characteristics of the coded aperture 30. In one embodiment, the coded aperture 30 may have an equal number of open elements in every row. This feature may be readily exploited for purposes of illumination intensity equalization because the sum of all pixel values in each row should be equal. It will be appreciated, however, that coded apertures with other mask patterns of varying complexity may also be used when estimating and normalizing intensity profiles.

Figure 11:
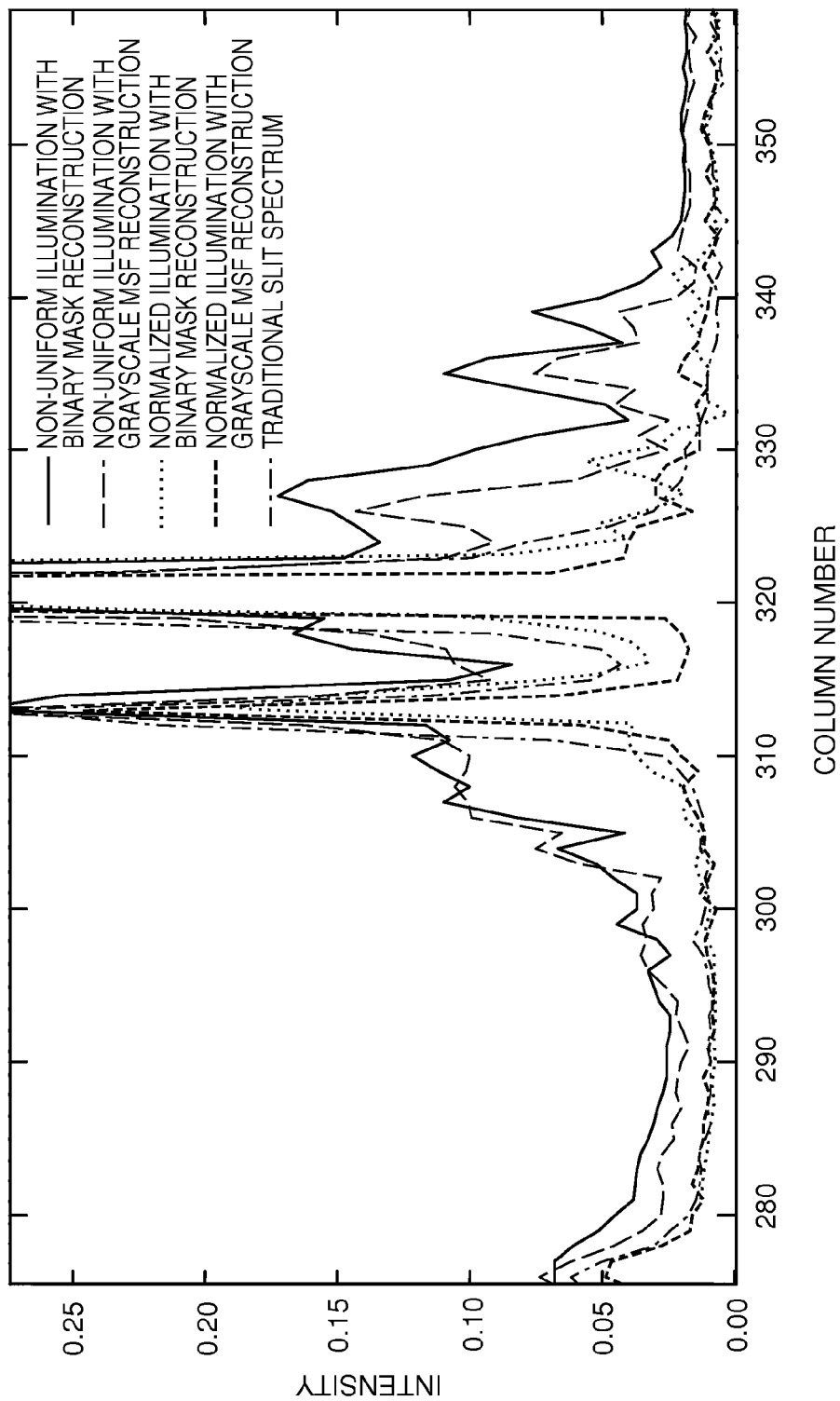
FIG. 11 shows exemplary reconstructed optical spectra obtained by static MMS measurement using binary mask reconstruction (non-normalized intensity profile), static MMS measurement using grayscale MSF reconstruction (non-normalized intensity profile), static MMS measurement using binary mask reconstruction (normalized intensity profile), static MMS measurement using grayscale MSF reconstruction (normalized intensity profile), and traditional measurement using a slit-based spectrometer.

By employing normalized intensity data in spectral reconstruction calculations, a much higher signal-to-noise ratio is attained. When these spectra are compared directly to reconstructed spectra calculated without the benefit of uniform aperture illumination, it is visually apparent that spectral artifacts and noise are minimized or eliminated altogether. FIG. 11 confirms that the illumination normalization advantage is realized in practice. FIG. 11 further illustrates the advantage obtained by combining the grayscale mask embodiment with the normalization embodiment, as discussed further below.

Figure 12:
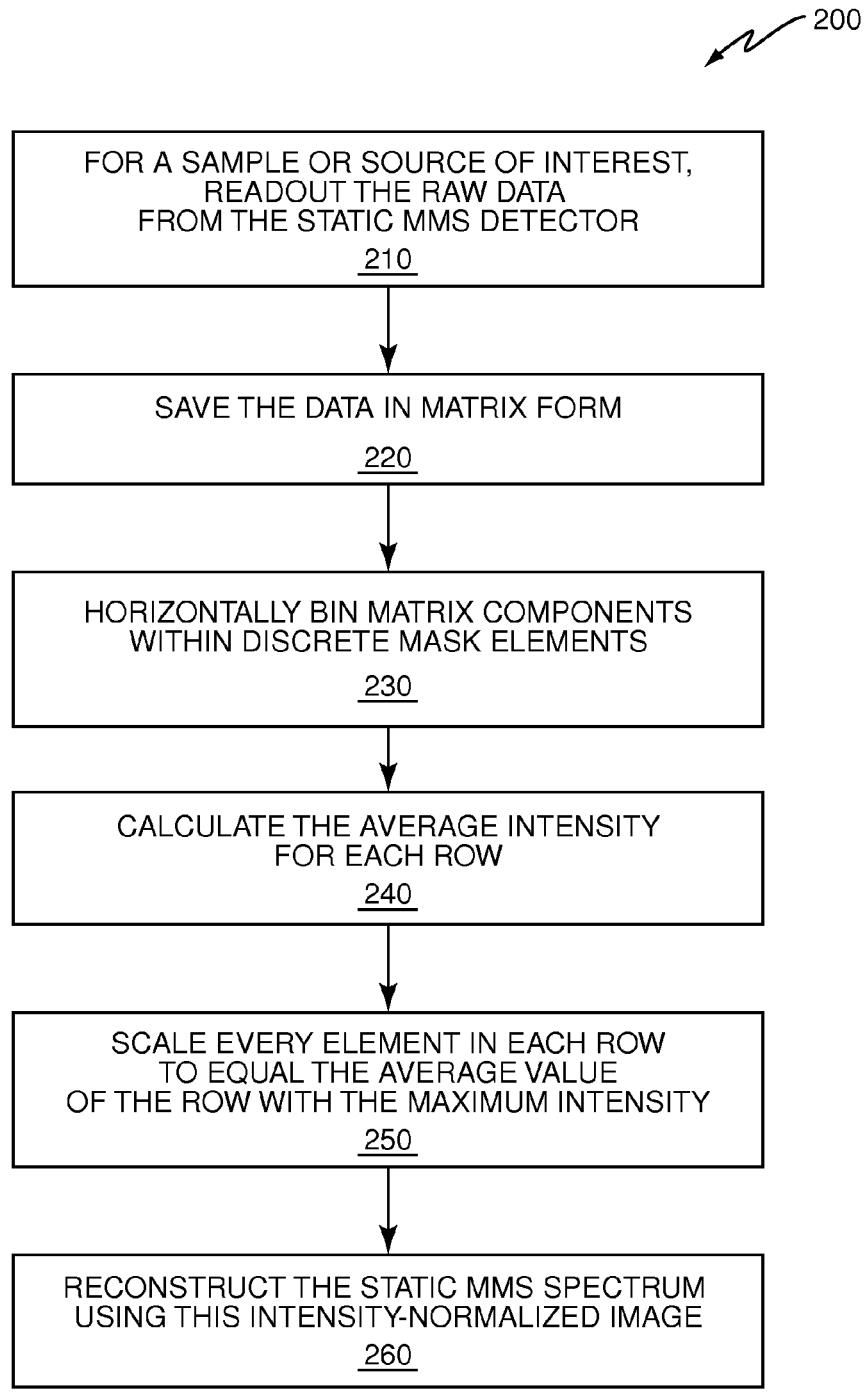
FIG. 12 shows a method of illumination normalization within the present invention.

FIG. 12 shows one exemplary process for the normalized embodiment 200. After collecting the raw dispersed mask image data from the detector 50 (block 210), the data is saved in matrix form (block 220). The horizontal pixels of the image within discrete mask elements are summed (e.g., "binned") as discussed above to produce a gross vertical intensity profile (block 230). An average intensity is then calculated for multiple rows of binned pixels (block 240) according to:

$$\alpha'_k = \sum_{l=1}^{N} b_{k,l}, \tag{8}$$

where $\alpha'$ represents an M×1 column matrix containing the summed intensity for the $k^{th}$ row and b represents an M×N data matrix from the dispersed mask image. Open rows are excluded from the illumination profile matrix and replaced with the average of the adjacent rows. The intensities in the rows are then scaled proportionally to equal the average value of the row having the maximum intensity to produce the normalized intensity profile $\bar{b}$ (block 250), as shown by Equation (9).

$$\bar{b}_{k,l} = \frac{\max(\alpha')}{\alpha'_k} b_{k,l} \tag{9}$$

It will be appreciated that while Equation (9) uses the maximum average intensity value, other average intensity values may alternatively be used. The normalized intensity profile is then binned based on the mask image element to detector element ratio to generate the normalized version of the spectral image $\vec{b}$ according to:

$$\vec{b}_{i,l} = \sum_{k=a(i-1)+1}^{ai} \bar{b}_{k,l}. \tag{10}$$

Finally, the resulting uniform intensity profile is used for static MMS spectral reconstruction (block 260), as shown in Equation (11), to reduce the spectral artifacts in the reconstructed optical spectrum.

$$Ax = \vec{b} \tag{11}$$

It will be appreciated that the grayscale mask and normalization embodiments may be combined to further reduce the spectral artifacts in the reconstructed optical spectrum. For this embodiment, either Equation (12) or Equation (13) may be used to generate the reconstructed optical spectrum.

$$\hat{A}x = \vec{b} \tag{12}$$

$$\bar{A}x = \vec{b} \tag{13}$$

It will be further appreciated that while Equations (11)-(13) use $\tilde{b}$ to reconstruct the optical spectrum, other embodiments may use $\bar{b}$ to reconstruct the optical spectrum.

In another example of the normalization embodiment, the reconstruction mask pattern A is modified to have the same general intensity profile as b, which creates the same effect as the above-described normalization process of Equations (8)-(13). For this example, elements of the dispersed mask image b are binned based on the mask image element to detector element ratio according to:

$$\tilde{b}_{i,l} = \sum_{k=a(i-1)+1}^{ai} b_{k,l}. \quad (14)$$

Equation (14) is similar to Equation (10), except that it is applied to the original dispersed mask image b. The elements of an averaged intensity profile $\tilde{\alpha}$ are calculated based on the binned masked image $\tilde{b}$ according to:

$$\tilde{\alpha}_i = \sum_{l=1}^{N} \tilde{b}_{i,l}, \quad (15)$$

where $\tilde{\alpha}$ represents an m×1 column matrix, and where $\tilde{\alpha}_i$ represents the summed intensity for the $i^{th}$ row of $\tilde{b}$. By scaling the intensities of the rows of the reconstruction mask pattern A according to:

$$\tilde{A}_{i,j} = \frac{\tilde{\alpha}_i}{\max(\alpha_i)} A_{i,j} \quad (16)$$

a modified version of the reconstruction mask pattern $\tilde{A}$ is obtained with the same intensity profile as b. Using this modified mask pattern $\tilde{A}$ to perform the spectral reconstruction according to:

$$\tilde{A}x=b \quad (17)$$

results in the same reconstructed optical spectrum as obtained by Equation (11). It will be appreciated that $\tilde{A}$ may be determined from Equation (16) using either $\hat{A}$ or $\bar{A}$ from the grayscale mask embodiment in place of A.

Figure 13:
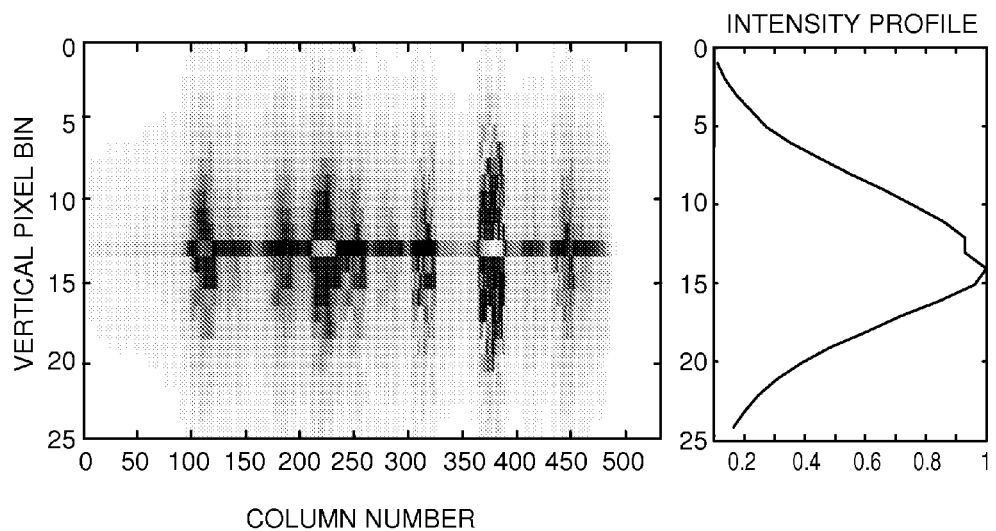
FIG. 13 shows an exemplary binned dispersed mask image at the detector array and the corresponding intensity profile.
Figure 14:
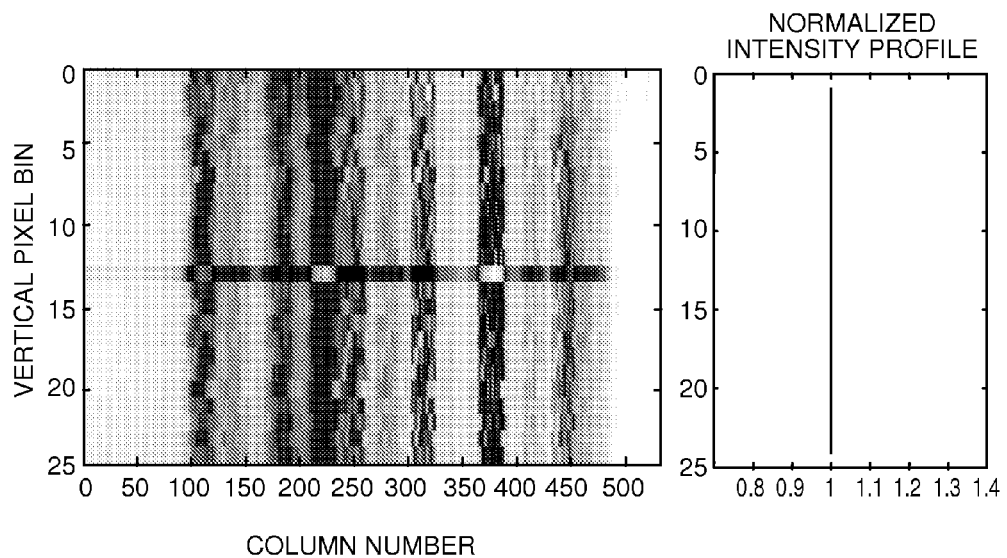
FIG. 14 shows an exemplary binned and normalized dispersed mask image at the detector array and the corresponding intensity profile.
Figure 15:
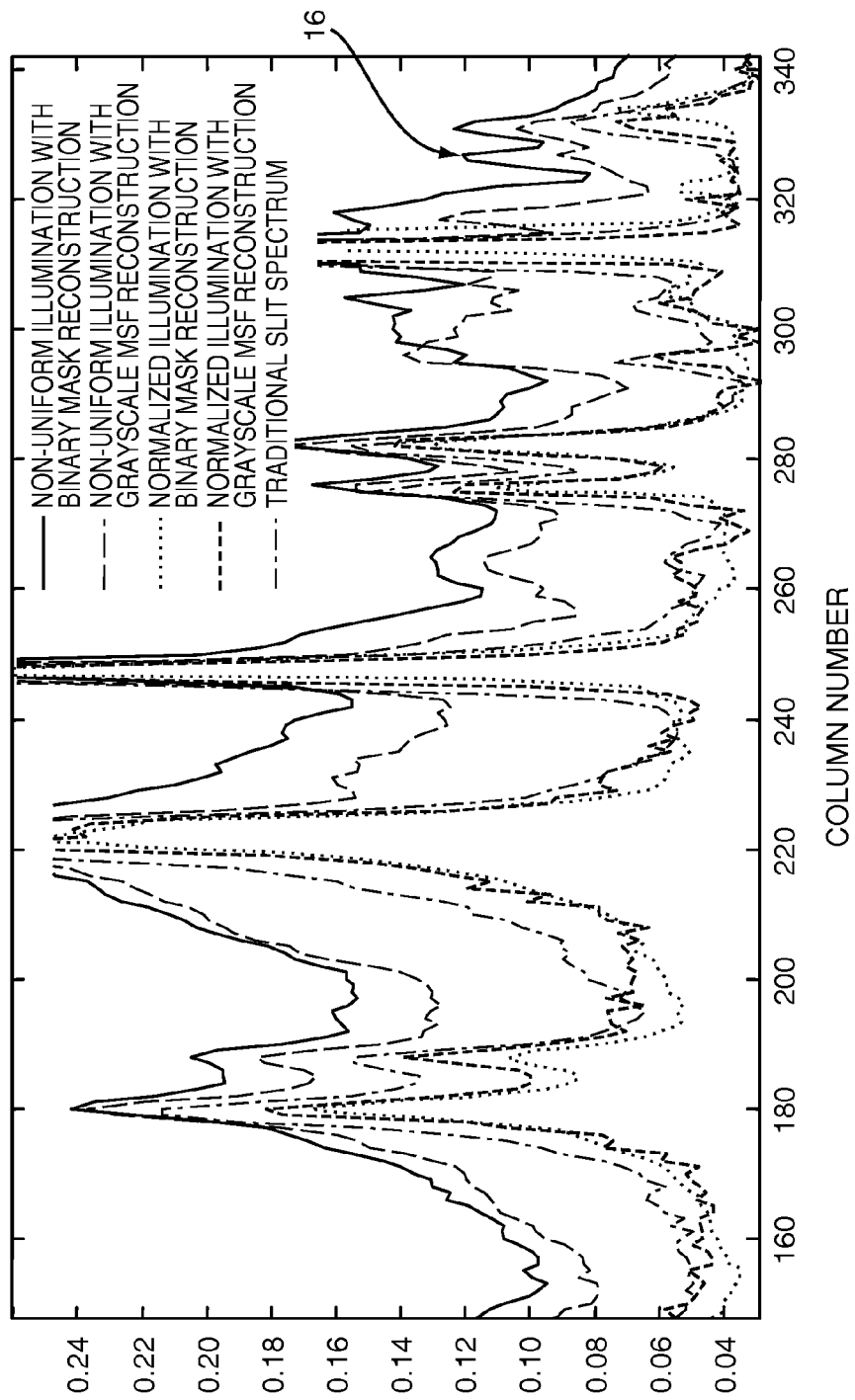
FIG. 15 shows exemplary reconstructed optical spectra obtained by static MMS measurement using binary mask reconstruction (non-normalized intensity profile), static MMS measurement using grayscale MSF reconstruction (non-normalized intensity profile), static MMS measurement using binary mask reconstruction (normalized intensity profile), static MMS measurement using grayscale MSF reconstruction (normalized intensity profile), and traditional measurement using a slit-based spectrometer.

FIG. 13 depicts the static MMS raw data for a room-temperature, liquid sample of methyl salicylate. The corresponding intensity profile is non-uniform and Gaussian. FIG. 14 illustrates the same spectral data following the intensity normalization described above. Note that the corresponding intensity profile is now uniform. FIG. 15 depicts a magnified view of the reconstructed optical spectra for select ranges of four room-temperature methyl salicylate analyses: one obtained by static MMS measurement using a non-uniform sample intensity profile coupled with binary mask reconstruction, one obtained by static MMS measurement using non-normalized illumination coupled with grayscale MSF reconstruction, one obtained by static MMS measurement using normalized illumination coupled with binary mask reconstruction, one obtained by static MMS measurement using normalized illumination coupled with grayscale MSF reconstruction, and one obtained by traditional measurement techniques using a slit-based spectrometer.

The signal-to-noise is lowest for the case of a non-uniform intensity profile paired with binary mask reconstruction, which includes large spectral artifacts 16. As illustrated in FIG. 15, signal-to-noise is substantially improved when normalized illumination is paired with binary mask reconstruction. Some spectral artifacts that appear in the un-equalized binary mask reconstruction are removed as well. Of the three static MMS spectral reconstructions, the best result is achieved when intensity normalization is paired with grayscale MSF deconvolution according to Equation (13). The features of the optical spectrum reconstructed in this manner most closely approximate the spectrum obtained by a traditional slit-based spectrometer, while the spectral resolution and etendue advantages of the static MMS measurement are retained.

The above discussions assume the image is linearly dispersed by the dispersion system 40. Due to the physics of a typical dispersion system 40, this assumption may be incorrect. In some cases, such as with the MMS system 10, the nonlinear dispersion of the dispersion system 40 leads to inaccuracies in the reconstructed optical spectrum. Another exemplary embodiment of the present invention, referred to herein as the dispersion correction embodiment, reduces the affects of nonlinear dispersion in the reconstructed spectrum.

The dispersion system 40 of the MMS system 10 disperses input light 7 into spatially separated spectral channels at the detector 50. The equation governing this dispersion is given by:

$$\sin(\theta_i) + \sin(\theta_d) = \frac{m\lambda}{d}, \quad (18)$$

where $\lambda$ represents the wavelength of light, $\theta_i$ represents the angle of an input ray at the dispersion system 40, $\theta_d$ represents the angle of an output ray exiting the dispersion system 40, m represents the diffraction order, and d represents the grating period. The location of specific spectral channels at the detector 50 may be determined by relating $\theta_d$ and $\lambda$. By assuming $\sin(\theta_i)$ is generally constant and that $\sin(\theta_d) \approx \theta_d$, Equation (18) may be reduced to:

$$\theta_d \approx C\lambda, \quad (19)$$

where C represents a constant. The resulting linear relationship between the output ray angle $\theta_d$ and the wavelength $\lambda$ serves as a reasonable approximation for many spectrometers. However, the result of such an approximation for a large range of input ray angles associated with spectral systems having wide apertures, such as an MMS system 10 with a coded aperture 30, causes nonlinear dispersion.

Figure 16A:
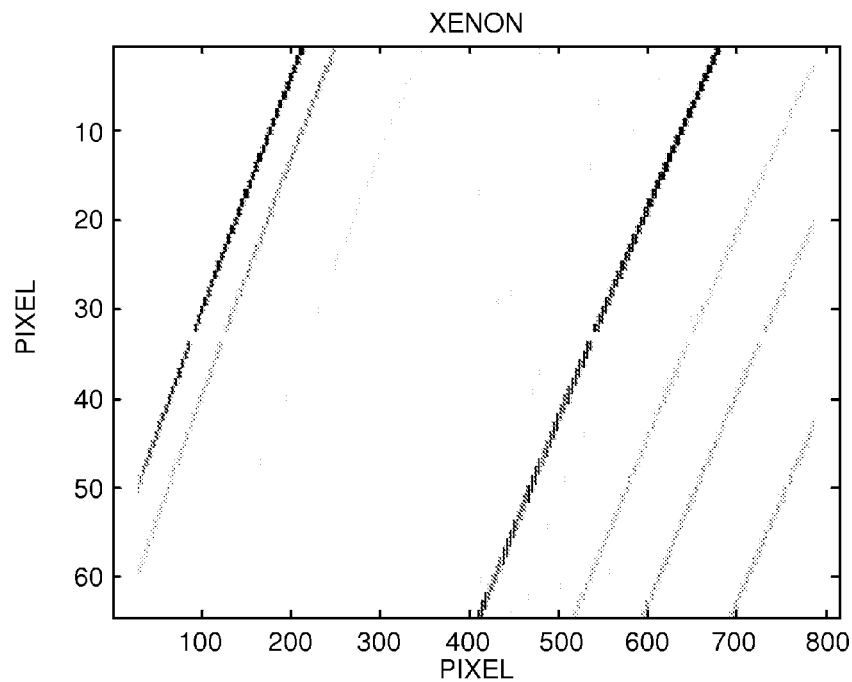
FIGS. 16A, 16B, and 16C respectively show a reconstructed spectral image, a rotated spectral image, and a reconstructed optical spectrum for a static multimode spectrometer with linear dispersion.
Figure 16B:
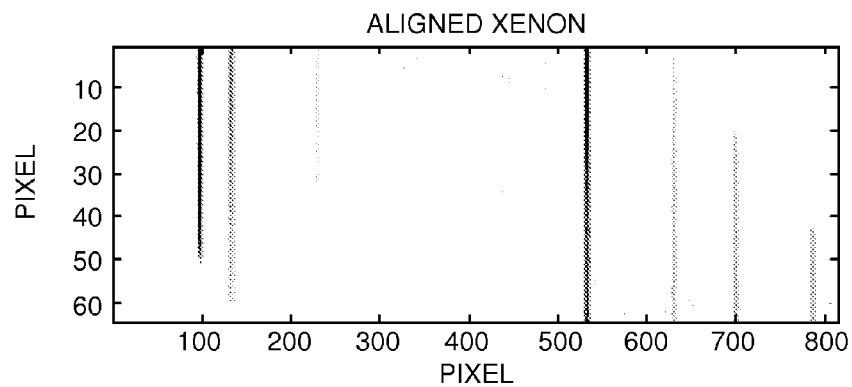
Figure 16C:
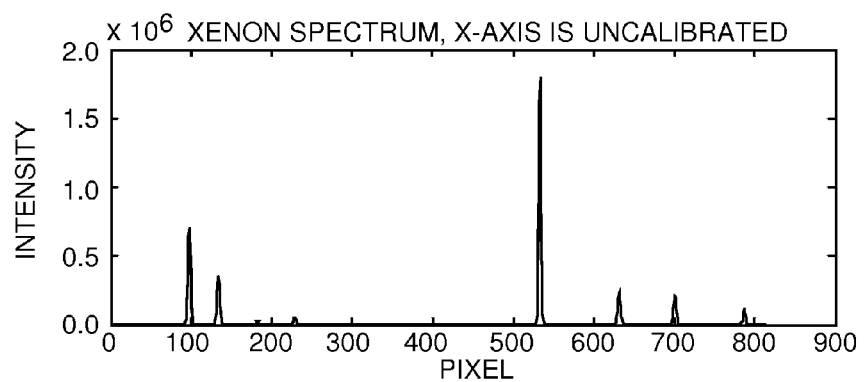
Figure 17A:
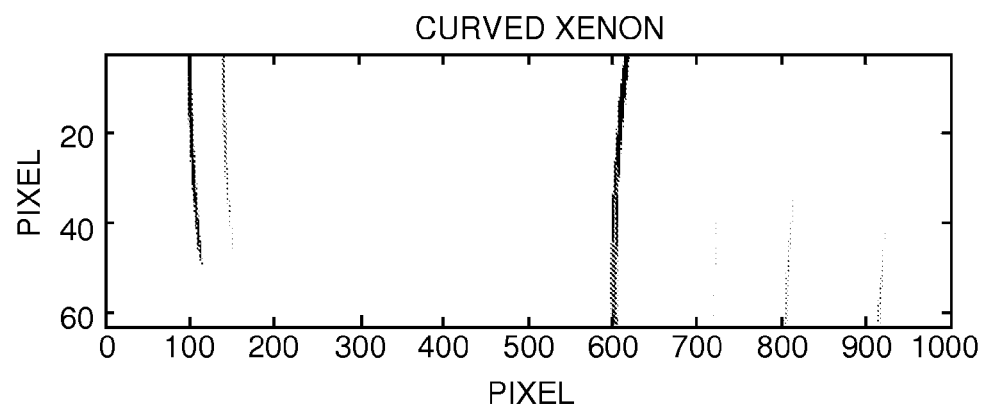
FIGS. 17A and 17B respectively show a rotated reconstructed spectral image and a reconstructed optical spectrum for a static multimode spectrometer with nonlinear dispersion.
Figure 17B:
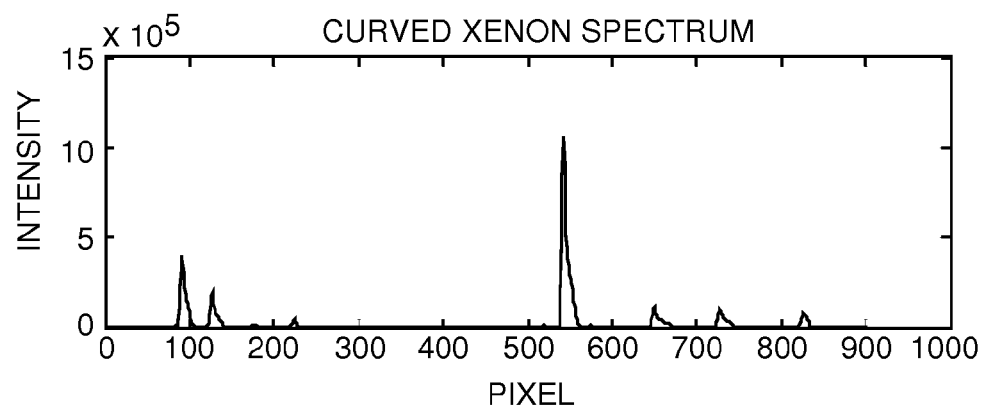

FIGS. 16-17 illustrate this phenomenon when a Xenon pen lamp is input to an optical spectrometer with linear dispersion (FIG. 16) and with nonlinear dispersion (FIG. 17). FIG. 16 shows the reconstructed spectral image x (FIG. 16A) resulting from solving any one of Equations (1), (4), (7), (11)-(13), or (17) in a optical spectrometer having linear dispersion, and the resulting reconstructed spectrum (FIG. 16C). Because the dispersion resulting from the dispersion system 40 is linear, the spectral content in the two-dimensional spectral image of FIG. 16A is represented by multiple diagonal lines having the same angle. Rotating the diagonal lines by the same constant amount results in multiple vertical lines corresponding to the spectral elements of the input light 7 (FIG. 16B). By summing the columns of the rotated spectral image, the reconstructed optical spectrum shown in FIG. 16C may be obtained.

Nonlinear dispersion causes the angle of the diagonal lines in the reconstructed spectral image to be different. Thus, rotating the spectral image by a constant amount produces the curved lines shown in FIG. 17A. Summing the columns of the rotated spectral image in the presence of nonlinear dispersion produces the reconstructed optical spectrum shown in FIG. 17B. Note that the resolution of the reconstructed spectrum in the presence of nonlinear dispersion (FIG. 17B) is significantly less than that of the reconstructed spectrum in the presence of linear dispersion (FIG. 16C). The resolution loss is due to the fact that nonlinear dispersion causes the columns in the rotated spectral image to be associated with multiple wavelengths. Thus, summing the intensity values in the columns effectively spreads the reconstructed optical spectrum.

The dispersion correction embodiment reduces the effects of this nonlinear dispersion by correctly mapping the intensities in the reconstructed spectral image to the correct wavelengths. Broadly, the dispersion correction embodiment determines a calibration data set based on the nonlinear response of the dispersion system 40 in the MMS system 10 to one or more calibration sources. The calibration data set maps the pixels of a spectral image to a specific wavelength. The processing unit 60 uses the calibration data set to electronically process a reconstructed spectral image resulting from an unknown source to reduce the effects of the nonlinear dispersion.

In one exemplary embodiment, the calibration data set is determined by fitting a curve to the peak intensities in the corresponding rows of a calibration spectral image at the detector array 50 resulting from one or more calibration sources. Due to the nonlinear dispersion, the fitted curve for each row will be a nonlinear function. For example, the fitted curve may comprise a second order polynomial, a sinusoid, etc. The set of fitted curves, where each fitted curve corresponds to a particular row of the reconstructed spectral image, represents the calibration data set.

The calibration source(s) includes two or more wavelengths that enable the determination of the desired curve. However, it will be appreciated that three or more wavelengths provide more accurate results. For example, if a calibration source comprises a xenon pen lamp, the first row of the reconstructed spectral image has three peaks as shown in Table 1.

TABLE 1

| Pixel number | Wavelength (nm) |
|---|---|
| 214 | 823.163 |
| 250 | 828.012 |
| 680 | 881.941 |

Fitting a curve to the three data points in Table 1 produces a nonlinear functional relationship between the pixel number and wavelength for the first row that may be used to map pixels from the first row of an unknown reconstructed spectral image to the correct wavelength. The curve fitting process is repeated for multiple subsequent rows to determine a row-specific functional relationship between pixel number and wavelength. In some embodiments, the curve fitting process is repeated for each row of the calibration spectral image. It will be appreciated that additional data points may provide a more accurate functional relationship. For example, Table 2 provides seven data points for the first row of a spectral image resulting from xenon and argon calibration sources.

TABLE 2

| Pixel number | Wavelength (nm) |
|---|---|
| 214 | 823.163 |
| 238 | 826.452 |
| 250 | 828.012 |

TABLE 2-continued

| Pixel number | Wavelength (nm) |
|---|---|
| 347 | 840.821 |
| 360 | 842.465 |
| 436 | 852.144 |
| 680 | 881.941 |

In a preferred embodiment, the calibration source(s) used to generate the calibration data set contain between three and ten wavelengths.

Figure 18A:
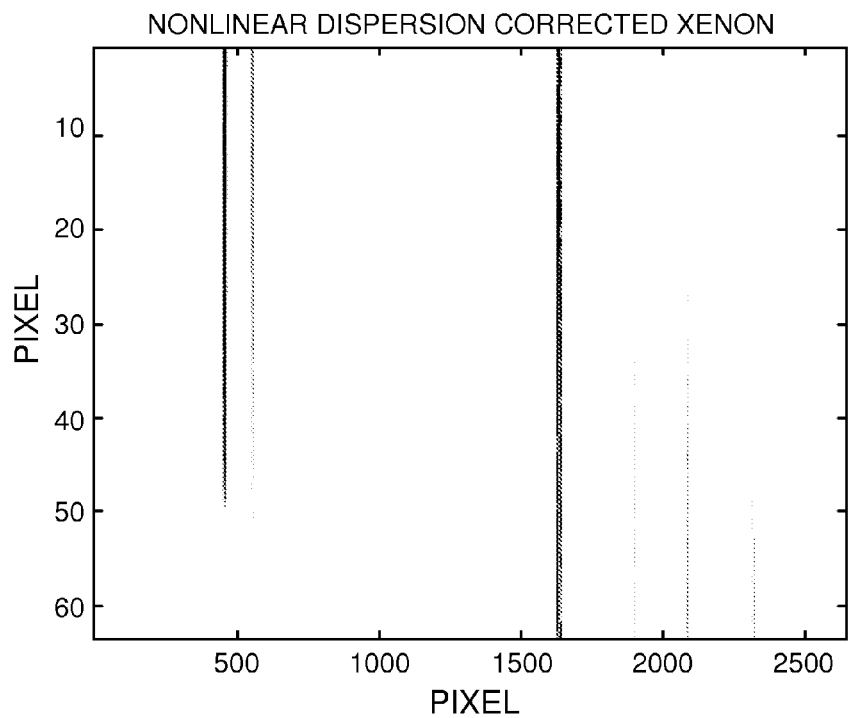
FIGS. 18A and 18B respectively show a rotated reconstructed spectral image and a reconstructed optical spectrum for a static MMS with nonlinear dispersion correction.
Figure 18B:
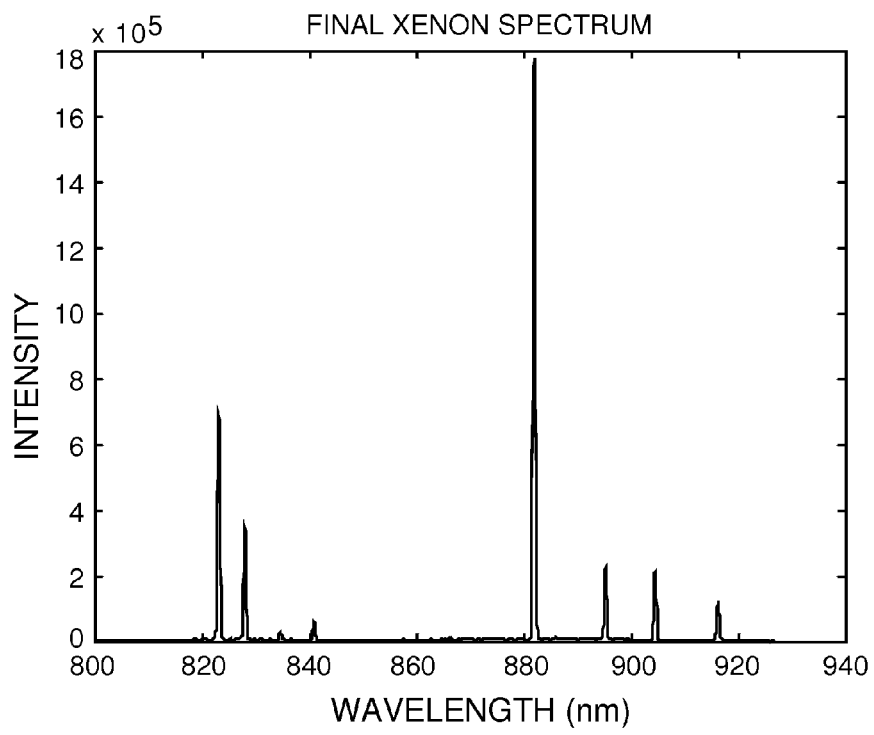

The processing unit 60 applies the calibration data set to the reconstructed spectral image associated with the unknown source light to reduce the nonlinear dispersion introduced by the dispersion system. Particularly, the processing unit 60 uses the calibration data set to map pixels of the unknown spectral image to the correct wavelength. The processing unit 60 generates the reconstructed optical spectrum by summing or combining the pixels of the unknown spectral image that corresponding to the same wavelength. FIG. 18 shows an example of a corrected reconstructed spectral image and the corresponding reconstructed optical spectrum.

It will be appreciated that the dispersion correction embodiment may be used separately from or jointly with the grayscale embodiment and/or the normalization embodiment.

While the above generally describes the dispersion correction embodiment, the following proves details for one exemplary implementation based on a coded aperture 30 comprising an S-matrix. It will be appreciated that the dispersion correction embodiment is not limited to the following implementation.

First, a calibration spectral image is generated from a dispersed mask image resulting from using a calibration source to provide the incident light. The calibration spectral image may comprise, for example, a matrix having 64 rows and 800 columns. After eliminating the zero row, e.g., row 33, from the reconstructed spectral image the data in each row is examined, one row at a time starting with the first row, to identify the data peaks in each row. Note, the step of eliminating the zero row is particular to the S-matrix implementation of the coded aperture 30 and is not required for all coded aperture implementations. When the source 5 comprises a xenon pen lamp, the first row of the reconstructed spectral image contains the three data peaks shown in Table 1 above. When the source 5 comprises xenon and argon pen lamps, the first row of the reconstructed spectral image contains the seven data peaks shown in Table 2 above. In any event, by fitting a curve to these data peaks, a functional relationship between pixel number and wavelength may be determined for the first row. To determine the calibration data set, this process is repeated for each remaining row to determine the functional relationship between the pixel number and wavelength for that row. For this example, the calibration data set contains sixty-three functional relationships (one for each of the non-zero rows) that map wavelength to pixel position for the corresponding row. The resulting calibration data set may be used to compensate for nonlinear dispersion in the reconstructed spectral image for any future reconstructed spectral images generated by the static MMS system used to generate the calibration data set. For example, processing unit 60 may process the reconstructed spectral image resulting from an unknown source using the calibration data set. If necessary, the processing unit 60 may further upsample and/or interpolate the functional relationship for one or more rows to generate additional data points, and therefore, to obtain the desired wavelength resolution. In any event, after the reconstructed spectral image is calibrated using the calibration data set, the pixel intensity values corresponding to the same wavelength are summed to determine an intensity value for that wavelength. This process is repeated for multiple wavelengths to generate the reconstructed optical spectrum.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating a reconstructed optical spectrum from light radiated from a source and incident on a static multimode multiplex spectrometer, the method comprising:
   determining a calibration data set that compensates for nonlinear dispersion associated with an optical system of the spectrometer based on an expected spectral response of light radiated from a calibration source and incident on the spectrometer, wherein the determining the calibration data set comprises:
      producing a calibration mask image at the detector array responsive to the light radiated from the calibration source;
      electronically processing the calibration mask image to generate a calibration spectral image, wherein said calibration spectral image comprises a matrix of wavelength-specific intensity values associated with the calibration source; and
      for each of two or more rows of the matrix, identifying two or more peak values and fitting a curve to the identified peaks to determine a functional relationship between wavelength and the pixels of the row;
   determining a correction mask that compensates for a non-ideal response of a propagation kernel of an optical system in the spectrometer;
   producing a dispersed mask image at a detector array of the spectrometer by applying the propagation kernel to the incident light; and
   electronically processing the dispersed mask image based on the correction mask to generate the reconstructed optical spectrum with reduced spectral artifacts.

2. The method of claim 1 wherein determining the correction mask comprises:
   applying the propagation kernel to light radiated from the calibration source to generate the calibration spectral image;
   processing the calibration spectral image to generate the calibration mask; and
   generating the correction mask based on the calibration mask.

3. The method of claim 2 wherein generating the correction mask based on the calibration mask comprises normalizing the calibration mask to generate the correction mask.

4. The method of claim 1 further comprising generally matching an intensity profile of the dispersed mask image to an intensity profile of a reconstructed mask pattern associated with the optical system, wherein electronically processing the dispersed mask image comprises electronically processing the dispersed mask image and the reconstructed mask pattern thereafter based on the correction mask.

5. The method of claim 1 wherein electronically processing the dispersed mask image comprises:
   generating a reconstructed spectral image by electronically processing the dispersed mask image based on the correction mask; and
   generating the reconstructed optical spectrum by electronically processing the reconstructed spectral image based on a predetermined calibration data set to reduce nonlinear dispersion effects in the reconstructed optical spectrum.

6. A method of generating a reconstructed optical spectrum from light radiated from a source and incident on a static multimode multiplex spectrometer, the method comprising:
   determining a calibration data set that compensates for nonlinear dispersion associated with an optical system of the spectrometer based on an expected spectral response of light radiated from a calibration source and incident on the spectrometer, wherein the determining the calibration data set comprises:
      producing a calibration mask image at the detector array responsive to the light radiated from the calibration source;
      electronically processing the calibration mask image to generate a calibration spectral image, wherein said calibration spectral image comprises a matrix of wavelength-specific intensity values associated with the calibration source; and
      for each of two or more rows of the matrix, identifying two or more peak values and fitting a curve to the identified peaks to determine a functional relationship between wavelength and the pixels of the row;
   producing a dispersed mask image at a detector array of the spectrometer responsive to the incident light;
   generally matching an intensity profile of the dispersed mask image to an intensity profile of a reconstructed mask pattern associated with the spectrometer; and
   electronically processing the dispersed mask image and the reconstructed mask pattern thereafter to produce a reconstructed optical spectrum with reduced spectral artifacts.

7. The method of claim 6 wherein generally matching the intensity profile of the dispersed mask image to the intensity profile of the reconstructed mask pattern comprises normalizing the intensity profile of the dispersed mask image in at least one dimension to generate a normalized version of the dispersed mask image, and wherein electronically processing the dispersed mask image and the reconstructed mask pattern comprises electronically processing the normalized version of the dispersed mask image relative to the reconstructed mask pattern to produce the reconstructed optical spectrum with reduced spectral artifacts.

8. The method of claim 7 wherein normalizing the intensity profile comprises:
   capturing the dispersed mask image on the detector array, said detector array comprising a plurality of rows of detector elements disposed in a direction generally perpendicular to the at least one dimension;
   computing an average intensity for multiple rows of detector elements; and
   scaling an output from multiple ones of the corresponding detector elements based on one of the computed average intensities to generate the normalized version of the dispersed mask image.

9. The method of claim 8 further comprising evaluating the average intensities to identify a maximum average intensity, wherein scaling the output comprises scaling the output from multiple ones of the corresponding detector elements based on the maximum average intensity.

10. The method of claim 7 wherein normalizing the intensity profile comprises normalizing the intensity profile in a direction generally perpendicular to a dispersion direction of the spectrometer.

11. The method of claim 6 further comprising:
generating a correction mask that compensates for a non-ideal response of a propagation kernel of an optical system in the spectrometer;
wherein generating the dispersed mask image comprises applying the propagation kernel to the incident light; and
wherein electronically processing the dispersed mask image and the reconstructed mask pattern comprises electronically processing the dispersed mask image and the reconstructed mask pattern thereafter based on the correction mask to generate the reconstructed optical spectrum with reduced spectral artifacts.

12. The method of claim 6 wherein electronically processing the dispersed mask image and the reconstructed mask pattern comprises:
generating a reconstructed spectral image by electronically processing the dispersed mask image; and
generating the reconstructed optical spectrum by electronically processing the reconstructed spectral image based on a predetermined calibration data set to reduce nonlinear dispersion effects in the reconstructed optical spectrum.

13. The method of claim 6 wherein generally matching the intensity profile of the dispersed mask image to the intensity profile of the reconstructed mask pattern comprises adjusting the intensity profile of the reconstructed mask pattern relative to the intensity profile of the dispersed mask image to generate a modified version of the reconstructed mask pattern having an intensity profile that generally matches the intensity profile of the dispersed mask image, and wherein electronically processing the dispersed mask image and the reconstructed mask pattern comprises electronically processing the modified version of the reconstructed mask pattern relative to the dispersed mask image to produce the reconstructed optical spectrum with reduced spectral artifacts.

14. The method of claim 13 wherein modifying the intensity profile of the reconstructed mask pattern relative to the intensity profile of the dispersed mask image comprises
computing an average intensity profile of the dispersed mask image; and
scaling the reconstructed mask pattern based on the computed average intensity profile to generate the modified version of the reconstructed mask pattern.

15. A method of generating a reconstructed optical spectrum from light radiated from a sample and incident on a static multimode multiplex spectrometer, the method comprising:
determining a calibration data set that compensates for nonlinear dispersion associated with an optical system of the spectrometer based on an expected spectral response of light radiated from a calibration source and incident on the spectrometer, wherein the determining the calibration data set comprises:
producing a calibration mask image at the detector array responsive to the light radiated from the calibration source;
electronically processing the calibration mask image to generate a calibration spectral image, wherein said calibration spectral image comprises a matrix of wavelength-specific intensity values associated with the calibration source; and
for each of two or more rows of the matrix, identifying two or more peak values and fitting a curve to the identified peaks to determine a functional relationship between wavelength and the pixels of the row;
producing a dispersed mask image at a detector array of the spectrometer responsive to the incident light radiated from the sample;
electronically processing the dispersed mask image to generate a reconstructed spectral image; and
electronically processing the reconstructed spectral image based on the calibration data set to produce a reconstructed optical spectrum with reduced nonlinear dispersion.

16. The method of claim 15 wherein electronically processing the reconstructed spectral image comprises mapping different pixels of the reconstructed spectral image to specific wavelengths based on the calibration data set.

17. The method of claim 15 wherein the calibration source comprises a source having at least two wavelength components.

18. The method of claim 15 further comprising determining a correction mask that compensates for a non-ideal response of a propagation kernel of the optical system, wherein electronically processing the dispersed mask image comprises electronically processing the dispersed mask image based on the correction mask to generate the reconstructed spectral image.

19. The method of claim 15 further comprising generally matching an intensity profile of the dispersed mask image to an intensity profile of a reconstructed mask pattern associated with the optical system, wherein electronically processing the dispersed mask image comprises electronically processing the dispersed mask image and the reconstructed mask pattern thereafter to generate the reconstructed spectral image.

20. A method of generating a reconstructed optical spectrum from light radiated from a source and incident on a static multimode multiplex spectrometer, the method comprising:
determining a calibration data set that compensates for nonlinear dispersion associated with an optical system of the spectrometer based on an expected spectral response of light radiated from a calibration source and incident on the spectrometer, wherein the determining the calibration data set comprises:
producing a calibration mask image at the detector array responsive to the light radiated from the calibration source;
electronically processing the calibration mask image to generate a calibration spectral image, wherein said calibration spectral image comprises a matrix of wavelength-specific intensity values associated with the calibration source; and
for each of two or more rows of the matrix, identifying two or more peak values and fitting a curve to the identified peaks to determine a functional relationship between wavelength and the pixels of the row;
producing a dispersed mask image at a detector array of the spectrometer responsive to the incident light; and
electronically processing the dispersed mask image to generate the reconstructed optical spectrum and to reduce spectral artifacts introduced into the dispersed mask image by at least one of the source, a non-ideal response of a propagation kernel of the static multimode multiplex spectrometer, and a dispersion system of the static multimode multiplex spectrometer.

21. The method of claim 20 wherein electronically processing the dispersed mask image comprises:
determining a correction mask that compensates for a non-ideal response of a propagation kernel of an optical system in the spectrometer; and electronically processing the dispersed mask image based on the correction mask to generate the reconstructed optical spectrum with reduced spectral artifacts.

22. The method of claim 20 wherein electronically processing the dispersed mask image comprises:
generally matching an intensity profile of the dispersed mask image to an intensity profile of a reconstructed mask pattern associated with the spectrometer; and
electronically processing the dispersed mask image and the reconstructed mask pattern thereafter to produce a reconstructed optical spectrum with reduced spectral artifacts.

23. The method of claim 20 wherein electronically processing the dispersed mask image comprises:
electronically processing the dispersed mask image to produce a reconstructed spectral image; and
electronically processing the reconstructed spectral image based on the calibration data set to produce a reconstructed optical spectrum with reduced spectral artifacts.

24. A static multimode multiplex spectrometer comprising:
an optical dispersion system to produce a dispersed mask image corresponding to light from a source and incident on the optical dispersion system; and
a processing unit configured to electronically process the dispersed mask image to generate the reconstructed optical spectrum and to reduce spectral artifacts introduced into the dispersed mask image by at least one of the source, a non-ideal response of a propagation kernel of the static multimode multiplex spectrometer, and a dispersion system of the static multimode multiplex spectrometer, wherein the processing unit determines a calibration data set that compensates for nonlinear dispersion associated with an optical system of the spectrometer based on an expected spectral response of light radiated from a calibration source and incident on the spectrometer, wherein the processing unit determines the calibration data set by:
producing a calibration mask image at the detector array responsive to the light radiated from the calibration source;
electronically processing the calibration mask image to generate a calibration spectral image, wherein said calibration spectral image comprises a matrix of wavelength-specific intensity values associated with the calibration source; and
for each of two or more rows of the matrix, identifying two or more peak values and fitting a curve to the identified peaks to determine a functional relationship between wavelength and the pixels of the row.

25. The method of claim 24 wherein the processing unit electronically processes the dispersed mask image by:
determining a correction mask that compensates for a non-ideal response of a propagation kernel of the optical dispersion system in the spectrometer; and
electronically processing the dispersed mask image based on the correction mask to generate the reconstructed optical spectrum with reduced spectral artifacts.

26. The method of claim 24 wherein the processing unit electronically processes the dispersed mask image by:
generally matching an intensity profile of the dispersed mask image to an intensity profile of a reconstructed mask pattern associated with the optical dispersion system; and
electronically processing the dispersed mask image and the reconstructed mask pattern thereafter to produce a reconstructed optical spectrum with reduced spectral artifacts.

27. The method of claim 24 wherein the processing unit electronically processes the dispersed mask image by:
electronically processing the dispersed mask image to produce a reconstructed spectral image; and
electronically processing the reconstructed spectral image based on the calibration data set to produce a reconstructed optical spectrum with reduced spectral artifacts.

* * * * *